United States Patent [19]

Rogers

[11] Patent Number: 5,433,119
[45] Date of Patent: Jul. 18, 1995

[54] TORQUE INDICATOR

[76] Inventor: John W. Rogers, 12667 Memorial Dr., #102, Houston, Tex. 77024

[21] Appl. No.: 52,548

[22] Filed: Apr. 26, 1993

[51] Int. Cl.⁶ ............................................... G01L 3/02
[52] U.S. Cl. .............................. 73/862.193; 73/862.37; 73/744
[58] Field of Search .................. 73/862.191, 862.25, 73/862.523, 862.37, 862.49, 714, 744, 862.193

[56] References Cited

U.S. PATENT DOCUMENTS

| | | | |
|---|---|---|---|
| 638,052 | 11/1899 | Heintz | 73/744 |
| 1,869,513 | 8/1932 | Seewald et al. | 73/862.37 X |
| 2,322,182 | 6/1943 | Walker | 73/862.37 |
| 2,398,167 | 4/1946 | Walker | 73/862.37 |
| 2,517,038 | 8/1950 | Sheffield | 73/862.49 |
| 2,709,071 | 5/1955 | Hild | 73/862.37 X |
| 2,775,889 | 1/1957 | Decker | 73/862.323 X |
| 3,581,562 | 6/1971 | Shorrock | 73/862.37 |
| 3,664,474 | 5/1972 | Blake et al. | 73/862.37 X |
| 4,133,206 | 1/1979 | Itida et al. | 73/862.49 |
| 4,791,839 | 12/1988 | Bickford et al. | 73/862.25 X |
| 4,823,616 | 4/1989 | Tambini | 73/862.25 X |

Primary Examiner—Richard E. Chilcot, Jr.
Assistant Examiner—Elizabeth L. Dougherty
Attorney, Agent, or Firm—Bush, Moseley, Riddle & Jackson

[57] ABSTRACT

A torque indicator system for use while rotating a screw pile into the ground with a positive displacement hydraulic motor, includes first and second hydraulic cylinders having their rods connected together in a manner such that net pressure forces are created in response to the high inlet and low outlet pressures of the motor. A pressure gauge mounted on one of the cylinder assemblies reads the working pressure drop across the motor, which is directly related to its output torque.

15 Claims, 2 Drawing Sheets

TORQUE INDICATOR

FIELD OF THE INVENTION

This invention relates generally to torque indicators, and particularly to a new and improved torque indicator system which is used in connection with a positive displacement hydraulic motor that operates to screw a foundation pile into the ground.

BACKGROUND OF THE INVENTION

Foundations for the support of equipment and pipelines used in the oil and gas industry can be supported by piles having helical blades which are screwed into the ground in a manner that is similar to a "self tapping" wood or metal screw. A positive displacement hydraulic motor whose output shaft is coupled to the top of the pile can be employed to turn it and thereby advance the pile into the ground. In a typical installation, piles are placed on opposite sides of the pipeline, and a suitable bracket that is connected to the upper end portions of the piles and to the pipeline provides a support or foundation therefore. Such installations typically are made at spaced points along the pipeline to provide adequate support, as needed.

The level of torque that is required to turn the screw pile is indicative of the strength of the soil, and can be used to predict the capacity of the pile. Low installation torque indicates a weak soil and low pile capacity, whereas high installation torque indicates a relatively strong soil and greater pile capacity. Where the required installation torque can be accurately measured, the approximate holding capacity of a screw pile can be reliably predicted.

A torque indicator that has been used in the past includes a pair of flange or disc members which provide a coupling mechanism that transmits torque between upper and lower sections of the motor drive shaft. The disc members are formed with a plurality of axially aligned pairs of holes, each of which is arranged to receive a metal pin having a known shear value, for example 500 ft. lbs. Most indicators of this type will accept from 1 to about 20 pins, and possibly more. When the operator desires that the drive shaft be disabled at a torque level of about 3,000 Ft. lbs., for example, a total of 6 shear pins are mounted in the holes in the disc members. Then the screw pile is torqued down into the ground until the pins shear off, which disables the motor drive shaft at that point.

If the screw pile that is being driven is not fully down when the pins shear, then a larger number of shear pins must be loaded into the disc members to provide a higher torque level at which the drive shaft will be disabled. In any event, a selected number of new pins must be used in order to drive another screw pile during continued foundation forming operations. Thus the necessity to repeatedly remove broken shear pins and replace them with new ones results in considerable down time which slows the progress of the work considerably, and thus increases the overall cost of pile foundation construction in an undesirable manner.

An object of the present invention is to provide a new and improved torque indicator system which accurately monitors screw pile installation torque while eliminating the disadvantages noted above.

Another object of the present invention is to provide a new and improved indicator system which provides a measurement of the pressure drop across hydraulic or pneumatic components.

SUMMARY OF THE INVENTION

This and other objects are attained in accordance with the present invention through the provision of a torque indicator system which includes, in one embodiment, first and second hydraulic cylinders mounted on a common bracket with their rods disposed end-to-end and connected to one another. The piston side of the first cylinder is in communication with the inlet or high pressure side of the hydraulic motor, and the rod side of the piston is in communication with a pressure gauge. The piston side of the second cylinder is in communication with the outlet or low pressure side of the hydraulic motor, and the rod side thereof is vented to the atmosphere.

With this arrangement of pans, any downstream back pressure against which the hydraulic motor operates produces a force on the second piston which is automatically subtracted from the force on the first piston due to the inlet pressure of the motor, so that the gauge reading is related to the true pressure drop across the motor. Since the pressure drop across a positive displacement motor bears an essentially straight line relationship to its output torque, the level of torque can be read directly from the gauge and used to determine the holding capacity of a screw pile that has been driven by such motor.

Another embodiment includes a combination of double and single rod cylinders mounted on a common bracket. The respective high and low side pressures of the hydraulic motor are fed to the respective opposite sides of a piston in the double rod cylinder, which has the respective rods extending out of the opposite ends thereof. One rod is connected to the end of the rod which extends out of the single rod cylinder. A pressure gauge monitors the pressure within the rod side of the single rod cylinder, which is a measure of pressure differential across the inlet and outlet ports of the motor. Thus the output torque of the motor can be determined by the pressure reading of the gauge.

In yet another embodiment, a tandem hydraulic cylinder assembly having a common inner end wall is used. A rod which connects the pistons of the respective units extend out the outer end of one cylinder, as well as through the common inner wall. A piston is mounted on the rod in each unit, and that piston which is in the unit where the rod extends to the outside is subjected to the high or inlet motor pressure on one side and to the low or motor outlet pressure on the other side. A pressure gauge which communicates with the rod side of the piston in the other unit reads the pressure differential thus imposed, which is directly related to the output torque on the motor.

Although use of the present invention in connection with the measurement of torque generated by a positive displacement hydraulic motor is noted in several instances herein, it will be recognized that the basic concepts of the invention can be used to measure the pressure drop across numerous hydraulic and pneumatic components.

BRIEF DESCRIPTION OF THE DRAWINGS

The present invention has various objects, features and advantages which will become more clearly apparent in connection with the following detailed descrip

DETAILED DESCRIPTION OF PREFERRED EMBODIMENTS

Figure 1:
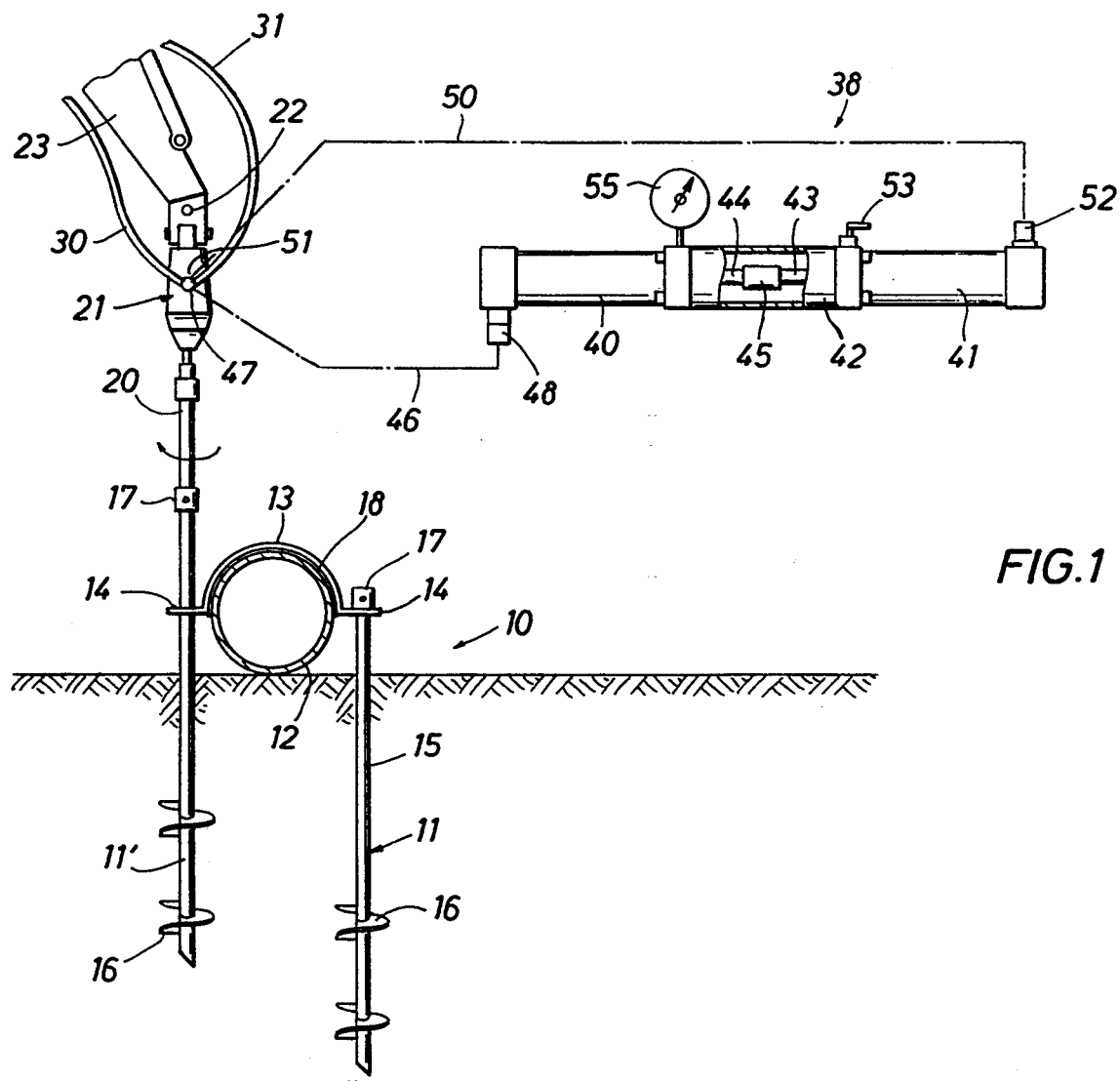
- FIG. 1 is a view of a screw pile-supported foundation for a pipeline being installed, and with the present invention being used to monitor torque of the drive motor.

Referring initially to FIG. 1, a typical pipeline screw anchor assembly is shown generally at 10. The assembly 10 includes a pair of anchors 11, 11' which are driven on opposite sides of a pipeline 12, and a semicircular bracket 13 having outwardly extending flanges 14 with holes which slidably receive the upper portions of the anchors 11, 11'. Each anchor includes an elongated steel bar or shaft 15 which can have a range of diameters suitable for a particular application, however for pipeline applications the most common shaft sizes are $1\frac{1}{4}"$ round or $1\frac{1}{2}"$ square bar having an overall length of about 10 feet. In some applications, larger shaft diameters in the range of 3–10 inches can be used, depending upon design loads and requirements. One or more steel helixes 16 are welded to each shaft 15 as shown, and function to screw the shafts down into the ground in response to torque applied to the upper ends thereof. When screwed fully down, an enlarged diameter coupling 17 on the top of each of the shafts 15 engages a flange 14 which extends outward of the bracket 13 to hold the pipeline 12 down against the ground. A protective pad 18 usually is positioned between the inner side of the bracket 13 and the adjacent outer surface of the pipeline 12.

As shown in FIG. 1, the anchor 11 has already been screwed down, and the anchor 11' is in the process of being screwed down. The stop collar 17 at the upper end of the anchor 11' is attached to a drive shaft 20 that is connected to the output of a positive displacement hydraulic motor 21. The motor 21 is nonrotatably suspended by a block 22 on the outer end of the boom 23 of a typical crane (not shown) so that the motor can be positioned out over the respective screw piles as they are driven. When the anchor has been rotated down until the stop collar 17 engages a flange 14, the drive shaft 20 is disconnected so that the motor 21 and the crane can be moved to another location along the pipeline 12 where another anchored bracket assembly is to be set.

Although a typical bracket 13 has been shown in FIG. 1, it will be recognized that numerous other bracket and support constructions can be used, depending upon the particular application. For example a beam that extends between top portions of the anchors 11 and 11' can be used to support a pipeline above ground level with a metal strap extending over the top of the pipe and bolted to the beam. A plurality of stop collars are bolted to the anchor shafts above and below the outer end walls of such beam. An essentially identical bracket assembly can be used to suspend the pipeline below the beam. An elongated beam which extends across the top of the anchors can support a plurality of parallel pipelines, and other similar structures can be fabricated, depending upon individual pipe support needs.

Figure 2:
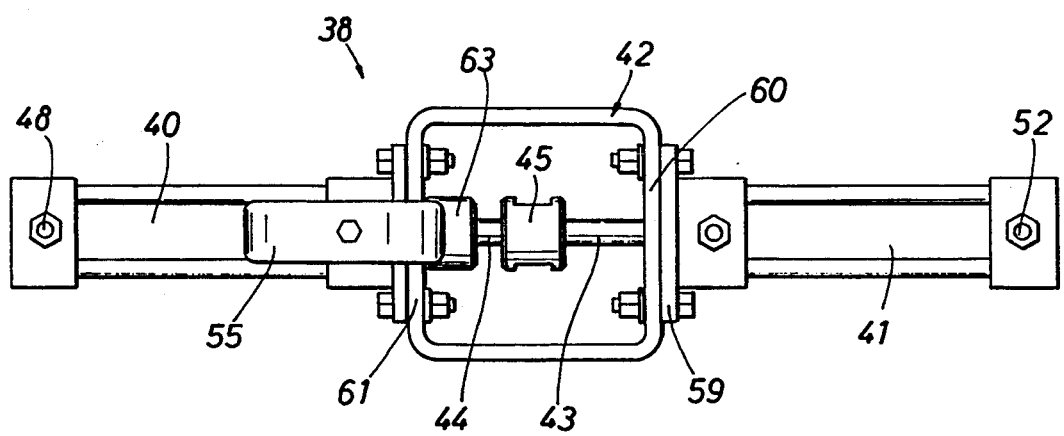
FIG. 2 is a more detailed top view of the cylinder apparatus of the present invention.
Figure 3:
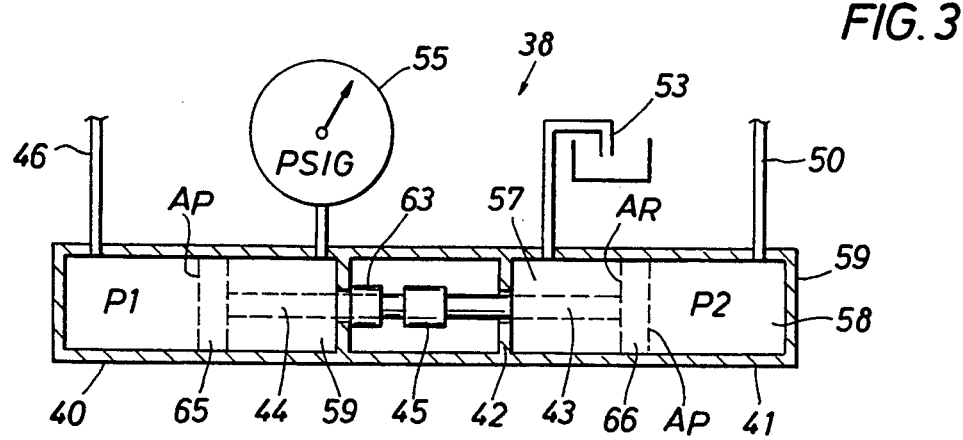
FIG. 3 is a schematic view of the embodiment shown in FIG. 2.

The level of torque that is required to screw an anchor pile 11 into the ground should be carefully monitored. As noted above the torque level is indicative of the strength of soil, and can be used to predict the capacity of the pile. Low installation torque indicates a weak soil, and high torque indicates a strong soil with greater pile capacity. When the required installation torque is known, the approximate minimum holding capacity of a screw pile can be reliably predicted. One embodiment of a torque indicator in accordance with the present invention is shown in FIGS. 1–3. The assembly can be positioned on the boom 23, or at any other location where observation is convenient. Hydraulic cylinders 40, 41 are mounted by bolts on a common bracket or fixture 42 in axially opposed relationship. The outer ends of the rods 43, 44 are connected rigidly together by a threaded nut 45. The piston end of the cylinder 40 is communicated with the high pressure input hose 30 which goes to the hydraulic motor 21 by a line 46 and fittings 47, 48, and the piston end of the opposite cylinder 41 is communicated with the low pressure outlet hose 31 of the motor by a line 50 and fittings 51, 52. The fittings 47 and 51 should be installed as near as possible to the motor 21, or other component, to minimize any unequal pressure loss which can occur between such fittings and the motor. The rod end of the cylinder 41 is vented to the atmosphere at 53, whereas the annular chamber inside the rod end of the cylinder 40 is communicated with a pressure gauge 55.

As shown in further detail in FIG. 2, the bracket 42 can be a short length of heavy-walled square tubing having a pattern of holes in its opposed sides 60 and 61 which receives the bolts by which the end flanges of the cylinders 40 and 41 are secured thereto. Enlarged center holes also are provided for the passage of the rods 43, 44. Such bolts rigidly fix the cylinders 43, 44 to the bracket, and as noted above, a nut 45 connects the outer ends of the rods 43, 44 to one another. A spacer or stop collar 63 preferably is mounted on the rod 44 in a manner such that it limits movement of the rod 44 into the cylinder 40 by engaging between the inside wall of the bracket 42 and the nut 45.

As shown in FIG. 3, which is an outline line drawing of the various pistons, rods and cylinder walls included in the assembly 38 to simplify the disclosure, the hydraulic line 46 which is in communication with the high pressure inlet side of the hydraulic motor 21 causes a pressure $P_1$ to act on the outer face of the piston 65 in the cylinder 40, such face having an area $A_p$. The hydraulic line 50 from the lower pressure outlet side of the motor 21 feeds that pressure $P_2$ to the outer face on the opposing piston 66 in the cylinder 41, such face having the same area $A_p$. The chamber 58 between the outer face of the piston 66 and the outer end wall 59 of the cylinder 41 also is filled with hydraulic fluid, as the annular chamber 59 on the rod side of the piston 65. The pressure gauge 55 monitors the pressure in the chamber 59. However, the annular region 57 in the rod end of the cylinder 41 is not fluid-filled, but contains air which is vented to the atmosphere by the fitting 53. The manner in which the invention operates to enable an accurate determination of the output torque of the motor 21 to be made now will be described.

The hydraulic motor 21 is powered by hydraulic fluid which is pumped in under pressure through the inlet line 30 as shown in FIG. 1. As the motor 21 turns, low pressure fluid is exhausted via the outlet line 31. Since the motor 21 is a positive displacement device, the torque which is applied to the drive shaft 20 and thus to a screw pile 11 is a substantially linear function of the pressure drop across the motor. As a pile shaft 15 is turned, the helixes 16 cause the pile to be advanced into the ground until the upper collar 17 engages a flange 14 on the bracket 13. As shown in FIG. 1, the screw pile 11 on one side of the pipeline 12 has already been torqued down, and the other screw pile 11' is in the process of being torqued down. Once both piles are driven, the pipeline 12 will be held firmly down against the ground as shown, which can be the bottom surfaces of a trench in which the pipeline is to be buried.

To determine the torque that is being generated by the motor 21 as a screw pile 11 is being driven, the indicator 38 illustrated in FIGS. 1-3 operates as follows. The resultant force which creates the pressure readings shown on the gauge 55 (assuming both cylinders to be of identical size) is equal to $P_1 \times A_p - P_2 \times A_p$, where $A_p$ is the cross-sectional area of a piston 65 or 66 in square inches, and $P_1$ and $P_2$ are the respective inlet and outlet pressures of the motor 21 in pounds per square inch. With $A_p$ factored out, the resultant force is equal to $A_p(P_1 - P_2)$. This force divided by the area $A_R$, which is the cross-sectional area in square inches of a piston 65 or 66 on the side of its rod 44 or 43, is the pressure reading of the gauge 55. Rearranging and substituting terms, it can be demonstrated that the pressure drop $(P_1 - P_2)$ across the motor 21 is equal to the ratio $A_R/A_P$ times the reading of the gauge 55. With the scale on gauge 55 adjusted by such ratio, which is known for a particular hydraulic cylinder, the gauge indication is directly related to the torque output of the particular motor 21. Although different motor assemblies may have different pressure/torque ratios, this information is readily available from the manufacturer of the motor.

Although in theory there may be no back pressure in line 31 downstream of the motor 21, many systems will have back pressure in this line due to flow restrictions of one kind or another, such as small size lines and valves, and perhaps other hydraulic systems that are connected therein. Since the rod 43 of the low pressure cylinder 41 is pushed by such back pressure in a direction that is opposite to the force on the rod 44, the back pressure forces are automatically subtracted from the high pressure forces in order to indicate the effective working pressure across the motor 31. Of course the system will function with or without back pressure.

Figure 4:
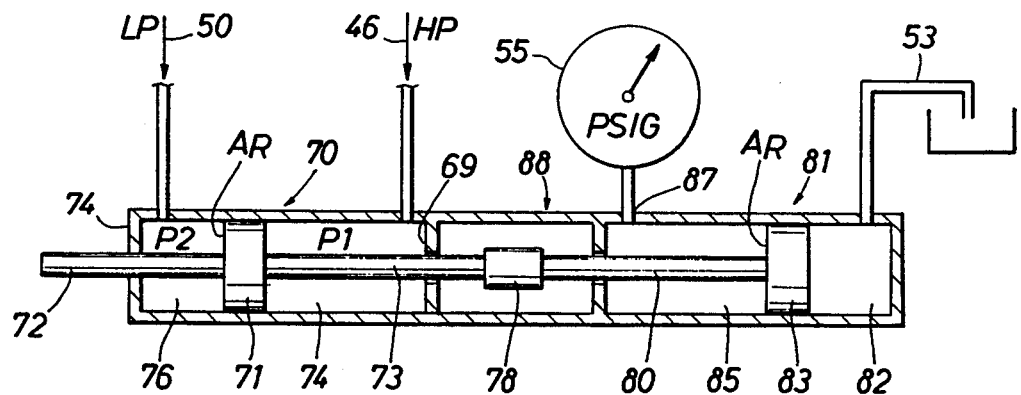
FIG. 4 is a view similar to FIG. 3 of another embodiment of the present invention.

Another embodiment of the present invention is shown schematically in FIG. 4. Again the various cylinder walls, pistons and rods are shown by lines in order to simplify the disclosure, and the various seal tings which prevent fluid leakage past the pistons and rods also are omitted for convenience, as in the previously described embodiments. Here a double rod cylinder 70 includes a piston 71 having oppositely extending rods 72, 73. The rod 72 extends through the outer end wall 74 of the cylinder 70, and the rod 73 extends out through the inner wall 69 thereof. The cylinder region 74 which surrounds the rod 73 to the fight of the piston 71 is placed in communication with the inlet or high pressure side of the hydraulic motor 21 by the line shown schematically at 46, and the annular region 76 to the left of the piston 71 is placed in communication with the outlet or low pressure side of the motor by the line shown schematically at 50. The regions 74 and 76 have equal cross-sectional areas.

The outer end of the piston rod 73 is attached by a coupling device 78 to the outer end of the rod 80 of a double acting cylinder 81. The rod ends of the cylinder assemblies 70 and 81 are mounted to one another by a bracket 88 that is similar if not identical to the bracket 42 shown in detail in FIG. 2. The internal region 82 to the fight of the piston 83 contains air and is vented to the atmosphere by a port and a fitting 53. The annular chamber 85 to the left of the piston 83 is communicated with a pressure gauge 55 at port 87. The regions 74, 76 and 85 are filled with hydraulic fluid. As in the previous embodiment, the pistons 71 and 83 have the same diameter, and the rods 72, 73 and 80 also have identical outer diameters.

The resultant or net force which creates the reading shown on the pressure gauge 55 is equal to $(P_1 - P_2) A_R$, where $A_R$ is the transverse cross-sectional area of a rod side of the piston 71. The gauge reading in pounds per square inch is this net force divided by the area $A_R$ of the rod side of the piston 83, or $(P_1 - P_2)$. Thus in this embodiment the gauge 55 reads the pressure drop across the hydraulic motor 21 without the necessity of scale adjustment, and enables the torque output of the motor to be readily determined.

Figure 5:
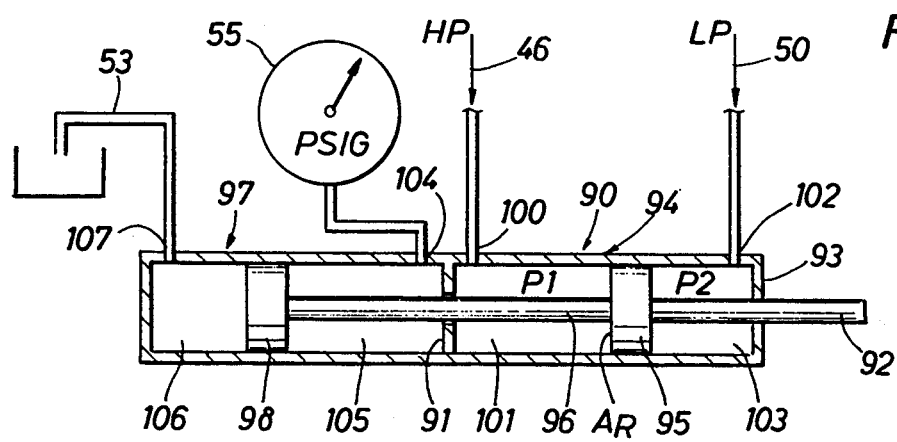
FIG. 5 is a schematic view of still another embodiment of the invention.

Another embodiment of the present invention is illustrated in outline form in FIG. 5. Here a tandem cylinder assembly 90 having a common end wall 91 is employed. A rod 92 which extends through the outer end wall 93 of the fight hand cylinder 94 is connected to a piston 95 that is slidably arranged therein. Another rod 96 which is attached to the other side of the piston 95 extends through the common wall 91 and into the left hand cylinder 97 where it is connected to another piston 98 that is slidable therein. The line 46 which communicates with the high pressure side of the motor 21 is to the port 100 and thus feeds high pressure to the annular chamber 101 which surrounds the rod 96 between the wall 91 and the inner face of the piston 95. The line 50 which is connected to the outlet or low pressure side of the motor 21 is connected to the port 102 on the right hand cylinder 94, and thus communicates such pressure to the annular region 103 between the piston 95 and the outer end wall 93. The gauge 55 is connected to the port 104, and thus senses the pressure of the hydraulic fluid in the annular chamber 105 which surrounds the rod 96 between the inner face of the piston 98 and the common wall 91. The internal space 106 to the left of the piston 98 contains air and is vented and exposed to atmospheric pressure by a port 107 and a fitting 53. The regions 105, 101 and 103 are filled with a suitable hydraulic oil. The pistons 95, 98 have identical diameters, as do the rods 96 and 92.

Hereagain the net or resultant force, in pounds, which creates a reading on the pressure gauge 55 is equal to $(P_1 - P_2) A_R$, where $A_R$ is the area of the exposed face of the piston 95 in square inches. The pressure reading of the gauge 55 is this net force divided by the area $A_R$, or $(P_1 - P_2)$ which is the pressure drop across the hydraulic motor 21. No scale adjustment is needed on account of relative cross-sectional areas of pistons and rods, and the gauge reading is directly related to motor torque.

Although the present invention has been described in connection with a hydraulic motor of the positive displacement type, the pressure drop across other hydraulic or pneumatic units can be measured. It is preferred that the fittings by which the lines 46 and 50 are made up are quick disconnect, no-spill fittings which are widely known in the industry. The lines 46 and 50 and the various internal regions of the cylinders should be prefilled prior to connection to minimize air entrapment.

It now will be recognized that a new and improved torque indicator system has been provided which will accurately measure the pressure drop across, and thus the torque output of, a positive displacement hydraulic motor that can be used to set screw pile foundations which support pipelines. The principles of the invention also are applicable to pneumatic motors and devices. Since certain changes or modifications may be made in the disclosed embodiment without departing from the inventive concepts involved, it is the aim of the appended claims to cover all such changes and modifications falling within the true spirit and scope of the present invention.

What is claimed is:

1. A system for use in measuring the torque output of a positive displacement hydraulic motor having an inlet by which high pressure fluid is supplied thereto and an outlet for exhausting low pressure fluid, comprising: first and second hydraulic cylinder means mounted in a manner such that the rod ends thereof are axially opposed, said first cylinder means having first piston and rod means which define a first piston area, said first piston having a rod side area; said second cylinder means having second piston and rod means defining a second piston area; means communicating said first piston area with said high pressure; means communicating said second piston area with said low pressure; and gauge means responsive to the pressure in said first cylinder means on the rod side of said first piston means for providing an indication of the difference between said high pressure and said low pressures, said pressure difference being linearly proportional to said torque output.

2. The system of claim 1 further including means for mounting said first and second hydraulic cylinder means in axial opposition, including rigid bracket means having opposite sides; means for connecting said first cylinder means to one of said sides; and means for connecting said second cylinder means to the other of said sides.

3. The system of claim 2 wherein said bracket means is generally square in cross-section to provide said opposite sides, said opposite sides each having an opening therethrough arranged to receive outer end portions of said rod means.

4. The system of claim 1 further including coupling means for connecting said rod ends to one another.

5. The system of claim 4 further including spacer means for limiting movement of said rod means into said first cylinder means.

6. A system for use in measuring the torque output of a positive displacement hydraulic motor having a high pressure inlet and a lower pressure outlet, comprising: first and second hydraulic cylinder means mounted in opposing relationship to one another, said first cylinder means being a double-rod, double acting device and said second cylinder means being a double acting, single rod device; means for connecting the adjacent ends of the rods of said cylinder means to one another; said first cylinder means including a first piston having annular areas on opposite sides thereof; said second cylinder means including a second piston having an annular rod side area on one side thereof; means for communicating said high pressure to one of said areas of said first piston; means for communicating said low pressure to the other of said areas of said first piston; and gauge means for indicating the pressure developed on said rod side of said second piston means as a result of said high and low pressures acting on said first piston, said pressure indicating being linearly proportional to the output torque of said motor.

7. The system of claim 6 further including bracket means for mounting said first and second cylinder means rigidly to one another.

8. The system of claim 6 further including means for venting the side of said second piston which is opposite to the rod side thereof to the atmosphere.

9. A system for use in measuring the output torque of a positive displacement motor having a high pressure inlet and a low pressure outlet, the difference in pressures at said inlet and outlet being proportional to said output torque comprising: a pair of tandemly arranged hydraulic cylinders having a common end wall; first piston and rod means in one of said cylinders, said rod means extending through said common wall and into the other of said cylinders; second piston means in said other cylinder connected to said rod means; second rod means connected to said first piston means and extending through the outer end wall of said one cylinder; means communicating said high pressure to one side of said first piston means; means communicating said low pressure to the other side of said first piston means; and gauge means for sensing the pressure in said other cylinder between said second piston and said common end wall, such pressure being representative of the difference between said inlet and outlet pressures of said motor.

10. The system of claim 9 further including means for venting the interior of said second cylinder between said second piston and the outer end thereof to the atmosphere.

11. A system for use in measuring the output torque of a positive displacement motor having a higher pressure inlet and a lower pressure outlet, comprising: cylinder means; piston means associated with said cylinder means and defining oppositely facing pressure surfaces; means to communicate the pressure of said inlet to one of said surfaces; means to communicate the pressure of said outlet to the other of said surfaces so that pressure forces applied to said piston means due to pressure from said outlet are subtracted from the pressure forces applied to said piston means due to pressure from said inlet, and gauge means for sensing a pressure in said cylinder means which is equal to the difference between said pressures.

12. The system of claim 11 wherein said cylinder means comprises oppositely disposed double acting cylinders, said piston means including a first piston member in one of said cylinders and a second piston member in the other of said cylinders, and further including rod means for connecting said piston members to one another.

13. The system of claim 11 wherein said cylinder means comprises a double rod cylinder assembly and a double acting cylinder assembly, said piston means including a piston member in said double rod cylinder assembly.

14. The system of claim 11 wherein said cylinder means comprises a double rod cylinder assembly and a double acting cylinder assembly, said assemblies having a common end wall, said piston means including a piston member in said double rod cylinder assembly.

15. A system for measuring the output torque of a positive displacement motor having a higher pressure inlet and a lower pressure outlet, comprising: a pair of cylinders having outer end walls and a common inner wall; first piston means slidably arranged in one of said cylinders and in part defining a first chamber; second piston means slidably arranged in the other of said cylinders and in part defining a second chamber; said piston means having inner sides facing one another and outer sides facing away from one another; first rod means extending through said common wall and connecting said inner sides of said piston means; second rod means connected to said outer side of said first piston means and extending through said outer end wall of said cylinder in which said first piston means is slidable; said outer side of said first piston means in part defining third chamber means; means for communicating said higher and lower pressures respectively to two of said chamber means; and transducer means associated with the remaining one of said chamber means for indicating the difference in said higher and lower pressures, said difference in pressures being proportional to said output torque.

* * * * *